United States Patent [19]

Courtois

[11] 4,204,658
[45] May 27, 1980

[54] SEAT-SUPPORTING SLIDES

[75] Inventor: Bernard Courtois, Etampes, France

[73] Assignee: Societe Industrielle Bertrand Faure, Etampes, France

[21] Appl. No.: 3,895

[22] Filed: Jan. 16, 1979

[30] Foreign Application Priority Data

Jan. 18, 1978 [FR] France .............................. 78 01370

[51] Int. Cl.² ............................................. F16C 29/02
[52] U.S. Cl. ..................................... 248/430; 74/533; 308/6 R
[58] Field of Search ................ 248/429, 430; 297/385; 308/3 R, 6 R, 3.8, 3.6; 74/533, 535

[56] References Cited

U.S. PATENT DOCUMENTS

| 2,951,527 | 9/1960 | Wassilieff | 248/430 X |
| 3,355,211 | 11/1967 | Kolle | 248/429 X |
| 3,685,872 | 8/1972 | Babbs | 248/430 X |
| 3,850,484 | 11/1974 | Cousin | 308/6 R |
| 3,872,740 | 3/1975 | Cousin | 74/533 |
| 3,889,913 | 6/1975 | Adams | 308/6 R X |
| 3,944,302 | 3/1976 | Fourrey | 308/6 R |
| 4,109,973 | 8/1978 | Terada | 74/533 X |

FOREIGN PATENT DOCUMENTS

| 940208 | 3/1956 | Fed. Rep. of Germany | 248/430 |
| 2309299 | 9/1973 | Fed. Rep. of Germany | 248/430 |
| 1417978 | 10/1965 | France | 248/924 |
| 2359006 | 7/1976 | France | 248/430 |
| 687090 | 2/1953 | United Kingdom | 248/430 |
| 1441272 | 6/1976 | United Kingdom | 248/430 |

Primary Examiner—J. Franklin Foss

[57] ABSTRACT

The invention concerns a vehicle seat slide comprising a lower channel section integral with the floor of the vehicle, an upper channel section integral with the sitting portion of the seat, intermediate balls and a locking mechanism comprising a toothed bolt mounted on the upper channel section adapted to coact with a series of catches in the lower channel section.

There is provided on one of the channel sections a series of vertical teeth and on the other a series of closed apertures disposed vertically opposite the teeth so that the beginning of a vertical dislocation of the slide results in the teeth catching in the apertures.

18 Claims, 13 Drawing Figures

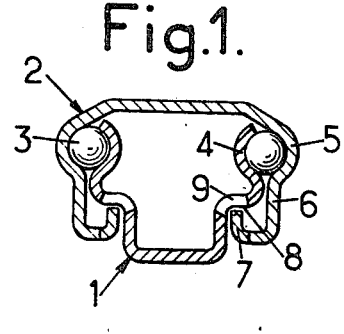
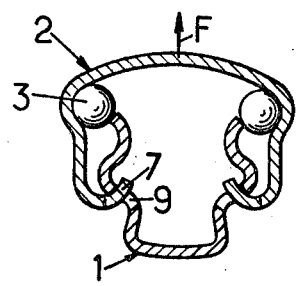
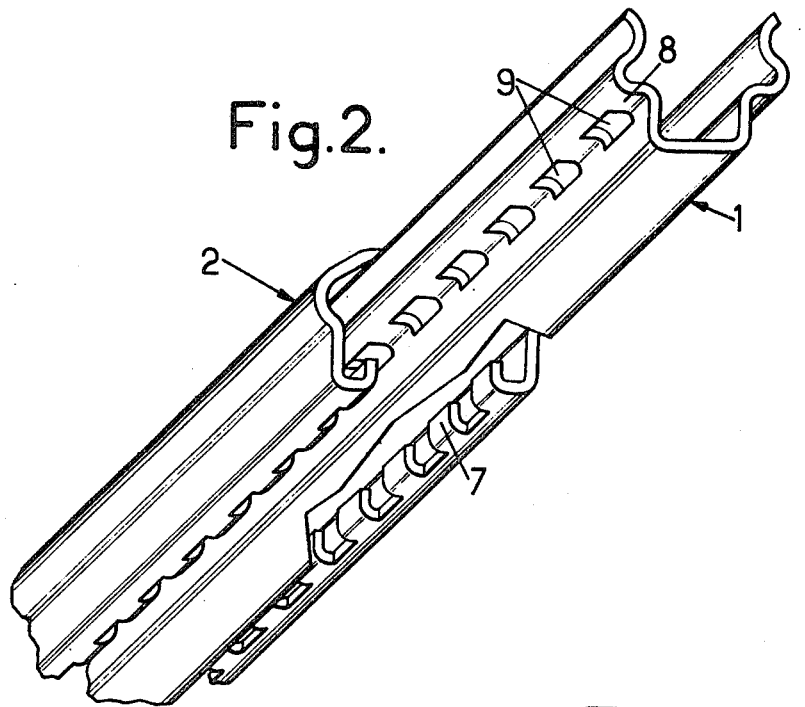
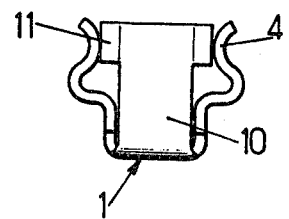

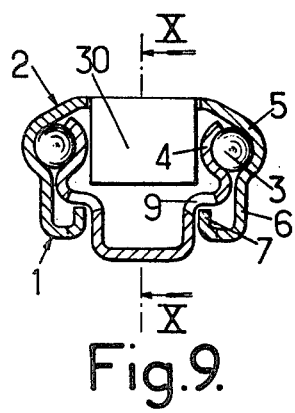
Fig.9.
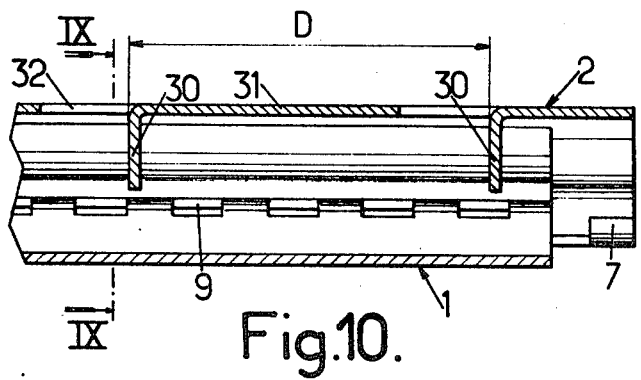
Fig.10.
Fig.11.
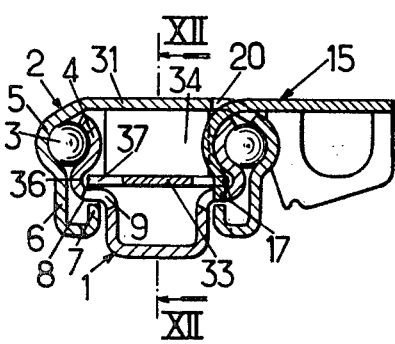
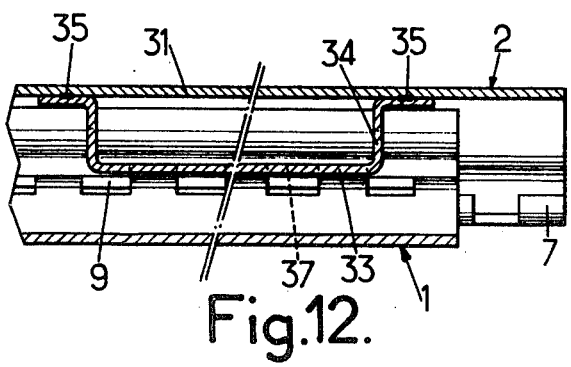
Fig.12.
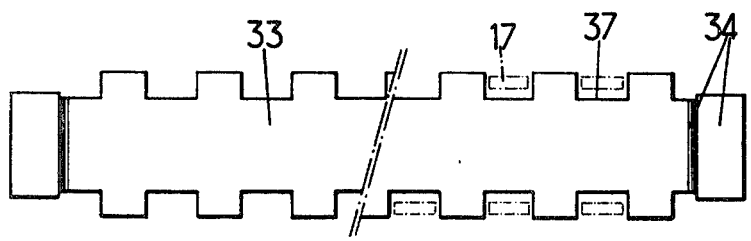
Fig.13.

SEAT-SUPPORTING SLIDES

The invention relates to slides for supporting seats, particularly the front seats of motor vehicles so as to make it possible to adjust their longitudinal position, i.e. forwards or backwards, these slides being generally two in number extending longitudinally on each side of the supported seat.

It relates more particularly, among these slides, to those comprising:

a lower channel section having substantially a U shape in cross-section and intended to be fixed to the floor of the vehicle, an upper channel section having preferably, in cross-section, the general shape of an upturned U straddling the lower channel section and intended to be fixed to the sitting portion of the seat, intermediate members, generally formed by balls, facilitating the sliding of the upper channel section along the lower channel section, and a locking mechanism actuated by the person sitting in the seat and allowing the upper channel section to be locked in one of a plurality of longitudinal positions in relation to the lower channel section, said mechanism comprising a toothed bolt mounted on the upper channel section and adapted to coact with a series of equidistant teeth or apertures in the lower channel section.

It is known that, during rapid deceleration of the vehicle, the back of the seat tends to be projected forwards: this stress tends to cause the seat to rock and to dislocate at least the rear end of the upper channel section of each slide from the corresponding lower channel section.

For this reason it is not practically possible to provide on the seat itself anchorage points for a safety belt, even if it is a question low points such as those used for lap belts: we are forced to anchor this belt exclusively at fixed points on the bodywork of the vehicle, which is not very rational for such a solution leads to separating the constructions and fittings of seats and those of the belts intended to equip these seats.

One interesting solution to this problem has certainly already been proposed which uses a two-jaw grip which straddles the upper channel section of the slide and hooks into two longitudinal channels opening downwardly, provided laterally in the lower channel section.

But this construction is cumbersome transversely which in some circumstances may constitute a disadvantage.

With the construction advocated by the invention, the resistance to the vertical dislocation of the upper channel section is very greatly increased and this without any increase of the transverse space required for the assembly.

In this construction according to the invention, each slide is characterized in that it comprises, on the one hand, on one of the two channel sections, a series of equidistant teeth of identical widths whose free ends are oriented vertically or at least in a direction very little inclined from the vertical, and on the other hand, on the other channel section, a series of closed apertures adapted to receive the above teeth and which, for the locked positions of the upper channel section, are disposed vertically opposite said teeth in a direction such that any vertical upward movement of the upper channel section tends to cause the teeth to go into the apertures, the series of teeth or apertures with which the toothed bolt of the locking mechanism being that one, of the two series of teeth and apertures considered, which is on the lower channel section or else a series of catches associated with the teeth or apertures of this latter series, the bolt in question being mounted so as to ensure automatically the vertical register indicated above between teeth and apertures during each locking.

In preferred embodiments, recourse is had to one and/or the other of the following arrangements:

the series of teeth is provided on the lower edge of a flange of the upper channel section bent successively horizontally inwardly of this channel section, then upwardly, the series of apertures being then cut out in an area, of the lower channel section, extending horizontally above said teeth, the lower edge of a flange of the upper channel section is bent back horizontally inwardly of this channel section and the series of apertures is provided in this bent back portion whereas the series of teeth is formed by cut-out studs extending downwardly, above said apertures, and obtained by cutting out other apertures in an area of the lower channel section, the bolt being adapted to cooperate with these other apertures, which then define the above catches, the teeth are formed so as to have a head narrower than the apertures intended to receive them and a base wider than these apertures, there is provided on one of the channel sections two lateral series of vertical teeth adapted to coact with the apertures of two lateral series of apertures provided on the other channel section, in a slide of the above kind comprising two ball races each formed by two longitudinal channels with a profile in the shape of an arc of a circle opening horizontally towards each other and comprised respectively in said channel section, the toothed bolt is pivotally mounted along the outer faces of two channels forming one of these ball races, the bolt straddling these faces which form a pivot therefor, the bolt according to the preceding paragraph comprises, on the one hand, a toothed lug passing through a window provided in the upper channel section, a curved portion in the shape of a cylindrical tile of said lug hugging jointingly the outer face of the channel which defines outwardly the ball race considered and, on the other hand, a vertical transverse flange whose edge, in the form of an arc of a circle jointingly mates with the outer face of the channel defining outwardly said ball-race, said flange having passing therethrough a longitudinal horizontal control rod pivotably mounted about a horizontal transverse axis connected with the upper channel section, the bolt according to the preceding paragraph comprises an outer stirrup-piece whose two legs form respectively two tabs adapted to slide jointingly against the outer channel face considered, in a slide according to at least the paragraph which precedes the preceding one, a return spring formed by a metal wire comprises one end anchored to the upper channel section, preferably on a transverse vertical lug forming a pivoting support for the control rod, the other end of this spring bearing under the transverse tab of the bolt through which said rod passes, preferably in a notch provided in the edge of this tab, the control rod forms one of the two legs of a hoop whose horizontal transverse middle portion is accessible to the person sitting in the seat, these two legs being permanently urged resiliently apart and each comprising an outer vertical lateral groove adapted to coact for the purpose of locking said hoop with the vertical edge of an aperture provided in a transverse vertical lug integral with the upper channel section and forming a pivoting support for said leg, to flexibly prevent the flanges of the lower channel section from coming together, a flap of this channel section is bent back between these flanges, said flap being extended laterally by two arms which extend in directions inclined with respect to the mean plane of the flap and bear against said flanges, the upper channel section carries at least one rigid cross-brace penetrating into the lower channel section so as to oppose mechanically the coming together of the flanges of this lower channel section, the rigid cross-brace is formed by at least one lug cut out in the horizontal back of the upper channel section, the rigid cross-brace is formed by a horizontal plate extending parallel to the back of the upper channel section and preferably mounted on this latter by means of two bent jambs extending the two longitudinal ends of this plate and welded to the lower face of this back, in a slide according to the preceding paragraph, the transverse dimension of the plate is greater than that of the jambs and its longitudinal lateral edges are housed in longitudinal throats in the lower channel section, in a slide according to at least the paragraph which precedes the preceding one, the lateral longitudinal edges of the plate are provided with notches adapted to receive vertically the ends of the teeth after they have passed through the apertures, some of the notches according to the preceding paragraph are adapted to receive and to guide the bolt, and preferably two parallel identical teeth forming the active part of this bolt.

The invention comprises, apart from these main arrangements, certain other arrangements which are used preferably at the same time and which will be more explicitly discussed hereafter.

In what follows, preferred embodiments of the invention will be described with reference to the accompanying drawings in a way which is of course in no wise limiting.

FIGS. 1 and 2 of these drawings show respectively in vertical cross-section and in a perspective bottom view, with parts cut away, a seat slide in accordance with the invention in its normal locked condition.

FIG. 3 shows the same slide in a section similar to that of FIG. 1, but in the deformed condition which it assumes when the upper channel section is subjected to a substantial stress causing vertical dislocation with respect to the lower channel section.

FIG. 4 shows in an end view a variation of the rear or front end of the lower channel section of said slide.

FIGS. 9 and 10 show respectively in cross-section along IX—IX of FIG. 10, and in longitudinal section along X—X of FIG. 9, a seat slide constructed in accordance with the invention.

FIGS. 11 and 12 show respectively in cross-section and in longitudinal section along XII—XII of FIG. 11 another seat slide constructed in accordance with the invention.

FIG. 13 shows a top view of a rigid cross-brace comprised in this latter slide.

Figure 5:
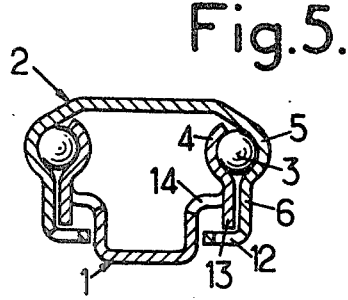
FIG. 5 shows in vertical cross-section another slide according to the invention in its normal locking condition.

In each of the embodiments shown the slide considered comprises a lower channel section 1 having the general shape of a U in cross section to be fixed to the floor of the vehicle;

an upper channel section 2 having the general form of an upturned U in cross section adapted to straddle the lower channel section and intended to be fixed to the sitting portion of the seat to be supported, balls 3 placed between these two channel sections so as to facilitate the sliding of the upper channel section along the lower channel section, and a locking mechanism actuatable by the person siting in the seat and enabling the upper channel section to be locked in one or other of a plurality of its longitudinal positions.

Balls 3 are housed in two parallel ball-races each formed by two horizontal longitudinal channels opening horizontally towards each other, one 4, formed by the end of a flange of the lower channel section, opening outwardly of this channel section and the other 5, formed by the root of a flange of the upper channel section, opening inwardly of this channel section.

The contiguous contact between the balls and the bottoms of the channels is advantageously provided by a slight resilient stress moving apart the flanges of the lower channel section and/or moving together the flanges of the upper channel section.

Balls 3 thus provide relative transverse guiding of the two channel sections 1 and 2 in relation to each other, not only horizontally but also vertically.

The cross-section of each channel is in the form of an arc of a circle extending over about 90°.

The lower end of each flange 6 of the upper channel section is furthermore extended by a lip bent first of all horizontally inwardly of this channel section, then vertically upwards and the end vertical bent portion is given the form of a rack, i.e. a series of vertical teeth 7 equidistant and of identical widths.

In the lower channel section there is provided a recessed zone for housing teeth 7 and there is cut out in the horizontal portion 8 of this channel section, defining from above this recessed zone, a series of rectangular equidstant apertures 9 adapted each to overhang a tooth 7 for the locking positions of the slide and to receive this tooth as soon as the vertical dislocation of the upper channel section begins to occur.

The slide thus defined works in the following way.

In normal conditions of use of the seat, the imprisonment of balls 3 between channels 4 and 5 is sufficient to maintain the upper channel section correctly fitting on the lower channel section and therefore to position accurately the seat in relation to the floor of the vehicle.

Balls 3 enable furthermore the longitudinal position of the upper channel section to be easily adjusted, by rolling, in relation to the lower channel section.

The cooperation of a toothed bolt with some of the apertures 9 then allows, as will be described further on, the upper channel section to be locked in its adjusted position: for this position each aperture 9 is above a tooth 7.

When the vehicle, because of an accident, is subjected to a particularly sudden deceleration, the seat tends to be projected forwards and to rock about its front base, the rear end of the upper channel section 2 tends to be dislocated vertically from the lower channel section 1, shown by arrow F (FIG. 3) and the upward thrust exerted on balls 3 by said upper channel section 2 nip slightly the flanges of the lower channel section 1 until the balls are freed: at the same time teeth 7 penetrate vertically into opposite apertures 9 and hook firmly on to these latter as can be seen in FIG. 3 by an effect of mutual "racking."

From then on the assembly of the two channel sections 1 and 2 behave like a monobloc rigid tube and the force which must be exerted on the upper channel section to dislocate it vertically from the lower channel section is considerable: it easily reaches double that required for dislocation with the jaw construction mentioned above.

This resistance to dislocation enables some of the anchoring points for the safety belt fitted to the seat connected to be located—generally "low" anchoring points—on the seat itself and no longer on the bodywork of the vehicle.

It is to be noted furthermore that the vertical "racking" thus provided practically instantananeously when a very sudden deceleration of the vehicle occurs ensures a very efficient longitudinal locking of the seat, the whole of the horizontal stops of teeth 7 against the edges of opposite apertures 9 then contributing to said locking and not just those of the teeth of the bolt: this is a very interesting advantage of the invention, which allows the demands relative to the robustness of the bolt to be reduced.

To add to the mutual fastening effect of the two channel sections a jamming effect which is reversible with difficulty, it is advantageous to give to the teeth a thinned down shape at the head widening progressively to the base, the width of each aperture adapted to receive a tooth being greater than the width of the head of each tooth but less than the width of its base. In such a case, there can be observed, after introducing each tooth into the opposite aperture, clamping of this tooth in this aperture by jamming: this effect adds to the difficulty in dislocating the upper channel section since, for this purpose, it is not only necessary to deform the metal forming the teeth but also to overcome the frictional forces due to the jamming.

To increase the resistance to pinching of the two flanges of the lower channel section, there is disposed between these flanges a distance piece formed advantageously by a flap 10 bent back from the bottom of this channel section (FIG. 4).

To avoid however such resistance to pinching being too high, which would risk causing too great an opening of the upper channel section likely to shift teeth 7 horizontally out of register with apertures 9, flap 10 is extended laterally by arms 11 extending in directions slightly inclined from the mean plane of this flap 10 and each bearing against the back of a channel 4, these arms being adapted to yield bendingly as soon as the stress tending to disclose the upper channel section exceeds a given value.

Instead of providing teeth on the upper channel section and apertures on the lower channel section, the reverse solution may be envisaged such as shown in the variation of FIG. 5.

This variation differs from the preceding one solely in its construction and the positioning of the teeth and the apertures: the apertures are here provided at 12 in horizontal bent back portions extending the lower ends of flanges 6 of the upper channel section inwardly of this channel section and the teeth are formed by studs 13 cut out in portion 8 of the lower channel section and extending downwardly, vertically or in a direction very little inclined from the vertical, to form an extension of the base of channel 4.

The zones of portion 8 freed by these studs form apertures 14 and it is with these latter, defining locking catches, that the toothed bolt of the locking mechanism cooperates.

It can be easily seen that when a high dislocating stress is exerted on the upper channel section, the apertures 12 of this latter enclose studs 13 and thus form as previously a monobloc tube very resistant to dislocation, not only vertically but also longitudinally.

In each of the two cases described, a double safety "racking" of the series of teeth or racks in the series of apertures which are associated therewith can be observed.

Figure 6:
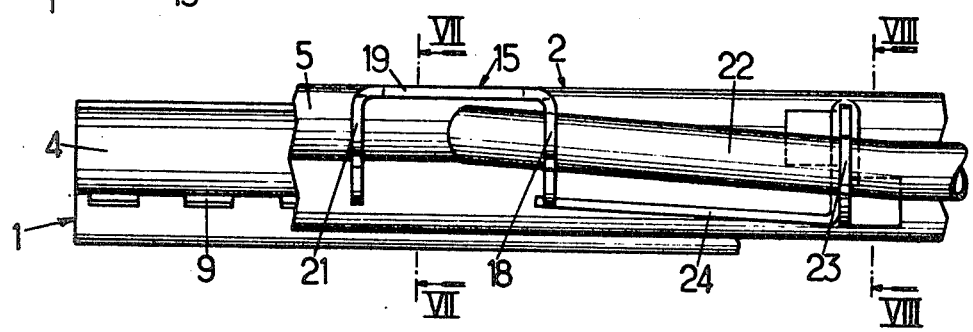
FIG. 6 shows a side view of a slide in accordance with FIGS. 1 to 3 above, fitted with its locking mechanism.

There will now be described a particularly advantageous embodiment of the locking mechanism itself with reference to FIGS. 6 to 8.

In this mechanism bolt 15 is pivotably mounted about the external faces, defining a cylinder of revolution, of the two channels 4 and 5 forming one of the ball-races 3.

For this purpose said bolt is formed by a bent and cut-out metal plate comprising on the one hand lug 16, inside the channel sections, bent like a cylindrical tile adapted to jointingly cover the outer face of channel 4, this lug being terminated by two teeth 17 adapted to coact with the apertures (9 or 14) of the lower channel section defining the locking catches and, on the other hand, at least one vertical transverse tab 18, outside the channel section, whose edge has a contour shaped in the arc of a circle adapted to mate jointingly with the outer face of channel 5.

This lug 16 and this tab 18 are connected by a substantially horizontal bridge 19 forming also part of the bolt and which passes through a rectangular window 20 provided in the upper channel section.

This window encompasses longitudinally without appreciable play bridge 19 and the longitudinal position of said window is chosen so that the resulting longitudinal positions of the two teeth 17 of the bolt coincide with those of two teeth 7 or apertures 12 of one of the two safety "series" comprised in the upper channel section 2: the result is that the register of teeth 17 of the bolt with apertures (9 or 14) of the lower channel section defining the locking catches is effected automatically at the same time as the racking teeth (7 or 13) are brought into register with the corresponding apertures (9 or 12).

To avoid any skewing of the bolt it is preferred to pair up tab 18 with a second tab 21, these two tabs then forming the two vertical and parallel arms of the same stirrup-piece whose bridge 19 forms the horizontal connecting portion, each of the two tabs having a curved bearing edge adapted to slide along the outer surface of channel 5.

The rocking of bolt 15 is advantageously controlled in the way described in the French patent of the application No. EN 77 31474, i.e. by means of a rigid longitudinal rod 22 pivotably mounted in a transverse vertical tab 23 welded to the upper channel section 2.

This rod 22 also passes without appreciable vertical play through a hole provided in the one of the two tabs 18,21 which is nearest tab 23.

Figure 7:
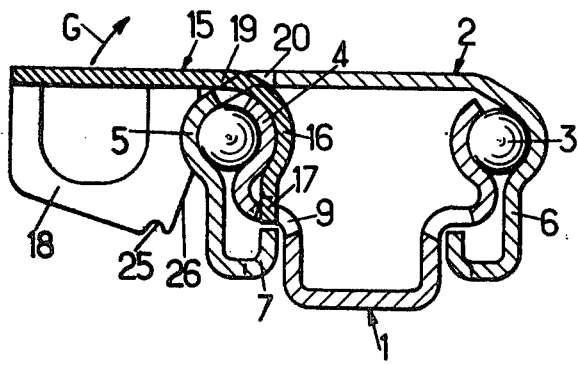
FIGS. 7 and 8 show on a larger scale this slide fitted with its mechanism, respectively in vertical sections along VII—VII and VIII—VIII of FIG. 6.
Figure 8:
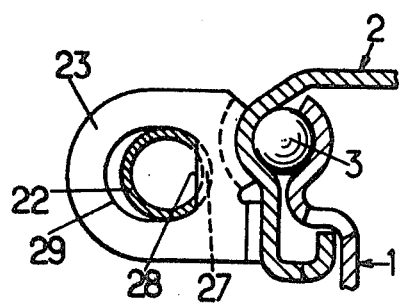

The resilient return of the bolt to its locked position, shown in FIG. 7, i.e. in the direction of arrow G, is provided by means of a metal wire 24 resisting bending one end of which is fastened on tab 23 while jointingly straddling this tab and whose other end is simply applied under tab 18, being preferably housed in a small slot 25 provided for this purpose in the edge of this tab 18.

An examination of FIG. 7 shows furthermore the following:

teeth 17 of the bolt, engaged in their apertures 9, are vertically opposite teeth 7 and disposed at a small vertical distance therefrom, each horizontal lip forming an extension at the lower part of flange 6 remains at a small vertical distance, generally of the order of 3 mm, from the level of the floor, which is often required to allow a carpet to be placed thereon.

The edges of these tabs 18,20 of the bolt have a rectilinear portion 26 which, when the teeth 17 of this bolt are sufficiently freed from apertures 9, abuts the external face of the opposite flanges 6, which defines the end of the unlocking travel, jug 16 and tabs 18, 21 of the bolt hem therebetween the two channels 4,5 which provides an extra resistance opposing the dislocation to be avoided.

In a way known per se, rod 22 forms advantageously one of the two legs of a hoop whose other leg controls the locking mechanism associated with the slide paired with the one considered here and fitted to the same seat, these two legs being connected to complete the hoop by a horizontal section extending transversely under the front end of the seat and accessible to the person seated thereon.

So as to mount this hoop very simply on the slides, it is advantageously arranged so that it is permanently urged slightly open, two vertical trenches 27 (FIG. 8) are hollowed out in the outer faces of its two legs and trenches 27 are made to coact resiliently with the vertical edges 26 of the reception holes 29 formed in tabs 23: there is no need to use any independent spring whatsoever for the hoop in order to lock the mounting of this latter.

To increase the resistance to pinching of the two flanges of the lower channel section, it was proposed above, with reference to FIG. 4, to bend back inwardly of this channel section, from the bottom of this latter, flaps 10 with a head widened at 11. This "widening" of the head of each flap is necessary because the width of the bottom of the lower channel section is smaller than the space separating the flanges to be cross-braced, at the level of their channels 4. This requirement limits in practice to the ends of the lower channel section the location of said flaps, as well therefore as the maintenance of the mutual separation between said channels.

To distribute very simply the maintenance in question along the whole of the lower channel section or more exactly along the whole of the portion of the lower channel section which is straddled by the upper channel section, it is preferably provided by rigid cross-braces plunging into the lower channel section from the lower channel section and spread out along the length of this latter.

In the embodiment of FIGS. 9 and 10, these cross-braces are formed by rectangular vertical lugs 30 cut out in the horizontal back 31 of the upper channel section, the width of these lugs being only slightly less than the distance separating the two channels 4 of the lower channel section.

Such lugs may be readily provided in intermediate zones along the length of the upper channel section. Their mutual distance D is for example between 5 and 10 cm. Their number is of course chosen within limits compatible with the robustness of the channel section, taking into account that the cutting out of lugs 30 in the back 31 results in the creation of apertures 32 in this back.

In the embodiment of FIGS. 11 to 13, the cross-bracing of the lower channel section is provided by means of a rigid horizontal plate 33 fixed to back 31.

This fixing is achieved preferably by two feet or jambs 34 themselves formed perferably by two longitudinal extensions of plate 33 bent in a Z and welded at 35 to the lower face of back 31.

Plate 33 is disposed preferably at the level of the longitudinal throats 36 of the lower channel section along which the lower edges of channels 4 fit together with the horizontal areas 8 and the lateral longitudinal edges of said plate penetrate fairly deeply into these throats, almost to their bottoms, e.g. within 1 mm of these bottoms.

In such a case, the corresponding width of plate 33 is of course greater than that of jambs 34.

Because of the location indicated for plate 33 these edges are vertically immediately adjacent apertures 9.

To avoid, during "racking," teeth 7 from abutting said plate, which would reduce the depth of their introduction into apertures 9 and so the efficiency of the coupling, it is advantageous to provide in the edges of this plate notches 37 disposed so as to be vertically opposite apertures 9 for each locking position of the upper channel section.

This latter arrangement presents moreover, unexpectedly, the interesting advantage of substantially improving the guiding of the above bolt 15.

In fact, each of teeth 17 of this bolt remains permanently engaged in a notch 37, even during unlocking, which eliminates the risk of slewing of said bolt as well as the resulting risks of jamming, risks which result from the fact that the longitudinal positioning of the bolt on the upper channel section is provided moreover solely by its being jointingly housed in the window 20 of this upper channel section.

In each of the embodiments described above with reference to FIGS. 9 to 13, the rigid cross-brace 30 or 33 of the upper channel section which is placed between the flanges of the lower channel section opposes mechanically the drawing together of these flanges, which increases considerably the resistance to vertical dislocation of the upper channel section from the lower channel section.

Following which, and whatever the embodiment adopted, there is finally provided a seat slide whose construction and operation follow sufficiently from what has gone before.

This slide present a number of advantages in relation to those known up to present, particularly that of an exceptional resistance to vertical dislocation, and this without increasing the space needed in the transverse direction, which allows the provision on this slide, or on the seat structure connected thereto, of at least the "low" anchor points of a safety belt. In this connection, it should be noted that the relatively large height of the slide which is made necessary for placing the vertical teeth, confers on this slide high resistance to bending, a quality required for making the most of the very high resistance to dislocation mentioned above. It is also to be noted, as mentioned above, that the "racking" according to the invention provides a particularly efficient longitudinal locking, which permits a less robust construction to be tolerated for the bolt itself than if it alone were to ensure such locking at the time of an accident.

As is evident, and as it follows already moreover from what has gone before, the invention is in no wise limited to those of its modes of application and embodiments which have been more especially considered; it embraces, on the contrary, all variations thereof, particularly:

those where the series "safety" teeth and apertures intended to mesh mutually together when dislocation of the slide begins are not provided over the whole length of ths slide but only in its rear part, those where each of the two channel sections of the slide comprise only a single series of "safety" teeth or apertures instead of two.

I claim:

1. A seat slide comprising a lower channel section intended to be fixed to the floor of a vehicle, an upper channel section intended to be fixed to the sitting portion of the seat, intermediate members such as balls placed between these two channel sections, and a locking mechanism actuatable by the person sitting in the seat and comprising a toothed belt mounted on the upper channel section and adapted to coact with a series of equidistant catches of the lower channel section, characterized in that it comprises, on the one hand, on one of the two channel sections, a series of equidistant teeth of identical widths whose free end is orientated vertically or at least in a direction very little inclined from the vertical and, on the other hand, on the other channel section, a series of closed apertures adapted to receive the above teeth and which, for the locked positions of the upper channel section, are disposed vertically opposite said teeth in a direction such that any vertical movement upwards of the upper channel section tends to make the teeth go into the apertures, the series of teeth or apertures with which the toothed bolt of the locking mechanism cooperates being that one, of the two series of teeth and apertures considered, which is on the lower channel section or else a series of catches associated with the teeth or apertures of this latter series, the bolt in question being mounted so as to ensure automatically the above mentioned vertical registering between teeth and apertures during each locking.

2. A slide according to claim 1, characterized in that the series of teeth is provided on the lower edge of one flange of the upper channel section bent back successively horizontally inwardly of this channel section, then upwardly, the series of apertures being then provided in an area of the lower channel section extending horizontally above said teeth.

3. A slide according to claim 1, characterized in that the lower edge of one flange of the upper channel section is bent back horizontally inwardly of this channel section and the series of apertures is provided in this folded back portion whereas the series of teeth is formed by cut-out studs extending downwardly, above said apertures, and obtained by cutting out other apertures in an area of the lower channel section, the bolt being arranged so as to cooperate with these other apertures, which then define the above studs.

4. A slide according to any one of the preceding claims, characterized in that the teeth are formed so as to have a head narrower than the apertures intended to receive them and a base wider than these apertures.

5. A slide according to any one of the preceding claims, characterized in that it comprises, on one of the two channel sections, two lateral sides of vertical teeth adapted to cooperate with the apertures of two lateral series of apertures provided on the other channel section.

6. A slide according to any one of the preceding claims, comprising two ball-races, each formed from two longitudinal channels with a profile in the form of an arc of a circle opening horizontally towards each other and comprised respectively in the two channel sections, characterized in that the toothed bolt is pivotably mounted along the outer faces of two channels forming one of the ball-races, the bolt straddling these faces which form a pivot therefor.

7. A slide according to claim 6, characterized in that the bolt comprises, on the one hand, a toothed lug passing through a window provided in the upper channel section, a portion bent in the shape of a cylindrical tile of said lug hugging jointingly the outer face of the channel which delimits inwardly the ball-race considered and, on the other hand, a transverse vertical tab whose edge, formed in an arc of a circle, meets jointingly with the outer face of the channel delimiting outwardly said ball-race, said tab being traversed by a horizontal longitudinal control rod pivotably mounted about a horizontal transverse axis connected with the upper channel section.

8. A slide according to claim 7, characterized in that the bolt comprises an outer stirrup piece whose two arms form respectively two tabs adapted to slide jointingly against the considered channel outer face.

9. A slide according to any one of claims 7 and 8, characterized in that a return spring formed by a metal wire comprises one end anchored to the upper channel section, preferably on a vertical transverse lug forming a pivotable support for the control rod, the other end of this spring bearing under the transverse tab of the bolt through which the control rod passes.

10. A slide according to any one of the preceding claims, characterized in that the control rod forms one of the two legs of a hoop whose transverse horizontal middle portion is accessible to the person sitting in the seat, these two legs being resiliently urged apart permanently and each comprising an outer vertical lateral groove adapted to coact for the purpose of locking said hoop with the vertical edge of a hole provided in a vertical transverse lug integral with the upper channel section and forming a pivotable support for said leg.

11. A slide according to any one of the preceding claims, characterized in that a flap of the bottom of the lower channel section is bent back between the flanges of this channel section, said flap being extended laterally by two arms which extend in directions inclined with respect to the mean plane of this flap and which bear against said flanges so as to flexibly avoid their drawing together.

12. A slide according to any one of the preceding claims, characterized in that it comprises furthermore on the upper channel section at least one rigid cross-brace penetrating into the lower channel section so as to oppose mechanically the mutual coming together of the flanges of this lower channel section.

13. A slide according to claim 12, characterized in that the rigid cross-brace is formed by at least one lug cut-out in the horizontal back of the upper channel section.

14. A slide according to claim 12, characterized in that the rigid cross-brace is formed by a horizontal plate extending parallel to the back of the upper channel section.

15. A slide according to claim 14, characterized in that the plate is mounted on the back of the upper channel section by means of two bent jambs extending the two longitudinal ends of the plate and welded to the lower face of said back.

16. A slide according to any one of claims 14 and 15, characterized in that the transverse dimension of the plate is greater than that of the jambs and in that its longitudinal lateral edges are housed in longitudinal throats of the lower channel section.

17. A slide according to any one of claims 14 to 16, characterized in that the longitudinal lateral edges of the plate are provided with notches adapted to receive vertically the ends of the teeth after they have passed through the apertures.

18. A slide according to claim 17, characterized in that some of the notches are adapted to receive and to guide the bolt, and preferably identical parallel teeth forming the active part of this bolt.

* * * * *